United States Patent
Kosarev et al.

(10) Patent No.: US 10,089,412 B2
(45) Date of Patent: Oct. 2, 2018

(54) METHOD OF AND SYSTEM FOR PROCESSING A SEARCH QUERY

(71) Applicant: YANDEX EUROPE AG, Lucerne (CH)

(72) Inventors: Mikhail Jurievich Kosarev, Moscow region (RU); Svetlana Anatolievna Perlovskaya, Moscow (RU); Valeriy Valeryevich Leletko, Altay region (RU)

(73) Assignee: YANDEX EUROPE AG, Lucerne (CH)

( * ) Notice: Subject to any disclaimer, the term of this patent is extended or adjusted under 35 U.S.C. 154(b) by 0 days.

(21) Appl. No.: 15/516,042

(22) PCT Filed: Nov. 3, 2015

(86) PCT No.: PCT/IB2015/058493
§ 371 (c)(1),
(2) Date: Mar. 31, 2017

(87) PCT Pub. No.: WO2016/156952
PCT Pub. Date: Oct. 6, 2016

(65) Prior Publication Data
US 2018/0189418 A1 Jul. 5, 2018

(30) Foreign Application Priority Data
Mar. 30, 2015 (RU) ................................ 2015111360

(51) Int. Cl.
*G06F 17/30* (2006.01)
*G06Q 20/20* (2012.01)
*G06Q 30/06* (2012.01)

(52) U.S. Cl.
CPC .. *G06F 17/30991* (2013.01); *G06F 17/30005* (2013.01); *G06F 17/30979* (2013.01); *G06Q 20/20* (2013.01); *G06Q 30/0601* (2013.01)

(58) Field of Classification Search
CPC ......... G06F 17/30991; G06F 17/30005; G06F 17/30979; G06Q 20/20; G06Q 30/0601
See application file for complete search history.

(56) References Cited

U.S. PATENT DOCUMENTS

| | | |
|---|---|---|
| 6,711,567 B2 | 3/2004 | Littlefield et al. |
| 7,487,144 B2 | 2/2009 | Shakib et al. |

(Continued)

FOREIGN PATENT DOCUMENTS

| | | |
|---|---|---|
| WO | 2001042872 A2 | 6/2001 |
| WO | 2011017558 A1 | 2/2011 |

(Continued)

OTHER PUBLICATIONS

International Search Report with regard to PCT/IB2015/058493 dated Feb. 9, 2016.

(Continued)

*Primary Examiner* — Jorge A Casanova
(74) *Attorney, Agent, or Firm* — BCF LLP

(57) ABSTRACT

A computer-implemented method of (800) and a system (316) for processing a search query received from an electronic device (302) associated with a user (170). The method comprises executing (802) a search based on the search query to generate search results; accessing (804) a register (340) comprising multiple entries; upon determining (806) that a search result resource associated with the at least one of the search results corresponds to the resource of the at least one of the multiple entries of the register, generating a graphical component (408, 508, 608) associated with the transaction service identifier; inserting (808) the graphical component (408, 508, 608) within a search result page (SERP); and transmitting (810) the SERP to the electronic device (302) for rendering on a display of the electronic device (302).

20 Claims, 8 Drawing Sheets

(56) References Cited

U.S. PATENT DOCUMENTS

| | | | |
|---|---|---|---|
| 7,979,457 B1 | 7/2011 | Garman | |
| 8,793,235 B2 | 7/2014 | Burkard et al. | |
| 9,842,361 B2* | 12/2017 | Whang | G06Q 20/027 |
| 2007/0038614 A1 | 2/2007 | Guha | |
| 2007/0294240 A1 | 12/2007 | Steele et al. | |
| 2009/0150343 A1 | 6/2009 | English et al. | |
| 2009/0171806 A1* | 7/2009 | Klinger | G06Q 30/0601 |
| | | | 705/26.1 |
| 2009/0259934 A1* | 10/2009 | Prisament | G06F 17/30893 |
| | | | 715/234 |
| 2010/0216425 A1* | 8/2010 | Smith | G06Q 20/32 |
| | | | 455/406 |
| 2011/0017558 A1 | 1/2011 | Nygren et al. | |
| 2012/0089457 A1* | 4/2012 | Seth | G06Q 30/0251 |
| | | | 705/14.49 |
| 2012/0157062 A1* | 6/2012 | Kim | G06Q 30/0601 |
| | | | 455/414.1 |
| 2012/0166267 A1* | 6/2012 | Beatty | G06Q 30/0219 |
| | | | 705/14.21 |
| 2013/0041879 A1 | 2/2013 | Moser | |
| 2013/0275210 A1* | 10/2013 | Johnson | G06Q 30/0276 |
| | | | 705/14.48 |
| 2013/0311285 A1 | 11/2013 | Abrol et al. | |
| 2014/0156626 A1 | 6/2014 | Salvetti et al. | |
| 2014/0280294 A1 | 9/2014 | Stekkelpak et al. | |
| 2015/0169704 A1* | 6/2015 | Stekkelpak | G06F 17/30864 |
| | | | 715/765 |

FOREIGN PATENT DOCUMENTS

| | | |
|---|---|---|
| WO | 2013090946 A1 | 6/2013 |
| WO | 2014184784 A2 | 11/2014 |
| WO | 2015028897 A1 | 3/2015 |
| WO | 2015028898 A1 | 3/2015 |

OTHER PUBLICATIONS

Meng et al., "Building Efficient and Effective Metasearch Engines", ACM Computing Surveys, 2002, vol. 34, No. 1, pp. 48-89.

International Preliminary Report on Patentability with regard to PCT/IB2015/058493 dated Jun. 27, 2016.

* cited by examiner

```
                                                                    10
┌─────────────────────────────────────────────────────────┐ ╱
│ Yandex  ┌FIFTY SHADES OF GREY -- 4 mins of answers  ×┐┌Search┐│
│ Search   ┌────┐ ┌─────────┐ ┌────┐                          │  12
│          │film│ │translate│ │read│                          │╱
│ Pictures └────┘ └─────────┘ └────┘                          │
│         ▭ 50 shades of grey | FIFTY SHADES OF GREY | vk    │
│           vk.com> fifty.shades ▽                            │
│ Video     Translation of film made for the group 50 Shades of Grey |fifty shades│
│           of grey. #50Shadesofgrey #FiftyShadesofGrey #50SG #FSOG│
│ Maps      #team50@fifty.shades.                             │
│          ┌──┐ Fifty shades of grey (FIFTY SHADES OF GREY) Drama,│
│          │  │ melodrama, USA, 2015 , 117 min.              │
│ Market   │  │ Producer: Sam Taylor- Johnson                │
│          └──┘ Cast: Jamie Dornan, Dakota Johnson, Luc      │
│          Theatre Showtimes Grayms, Victor Rajsuk, Eloisa Mamford,│
│ Poster   Park Metropolis Cinema Marsha Gei, Harden, Rita Ora, Max Martini, Callum Kit│
│                Renni, Jennifer Eli                          │
│                                                   14        │
│              ⎛▽Trailer⎞ ⎛Buy Ticket⎞  ╱                     │
│                15:30 16:30 17:10 18:00 19:00 ⎫              │
│                19:40 20:30 21:00 21:35 22:10 ⎪  16          │
│                ┌───┐┌───┐┌───┐┌───┐          ⎬ ╱            │
│                23:00 23:50 00:10 00:45       ⎪              │
│ 5 stars at Nightingale └───┘└───┘└───┘└───┘  ⎪              │
│ Theatre        ┌───┐┌───┐┌───┐┌───┐┌───┐     ⎪              │
│                16:30 19:00 19:20 21:35 23:10 ⎪              │
│                └───┘└───┘└───┘└───┘└───┘     ⎪              │
│                ┌───┐                         ⎪              │
│                00:10                         ⎪              │
│ ┌All showtimes and theaters >┐ └───┘        ⎭              │
│                15:10 16:25 17:35 18:50 20:00               │
│ ▷ FIFTY SHADES OF GREY - YOUTUBE                            │
│ YOUTUBE.COM > USER/FIFTYSHADESMOVIE                         │
│ THE OFFICIAL YOUTUBE CHANNEL OF FIFTY SHADES OF GREY. FIFTY │
│ SHADES OF GREY IS THE HOTLY ANTICIPATED FILM ADAPTATION OF  │
│ THE BESTSELLING BOOK THAT HAS BECOME...                     │
│ ⋈<<FIFTY SHADES OF GREY>> 166.246 songs - listen free online.│
│ ololo.fm > 18 056 639 songs > FIFTY SHADES OF GREY ▽        │
└─────────────────────────────────────────────────────────┘
      ┌──────────────────────────────────────────────────┐  20
      │ ┌──┐ Cinderella                      ┌Moscow ▽┐ ×│ ╱
      │ │  │ Showtimes today  ▽              └────────┘  │
      │ └──┘                                              │
      │ Search 🔍 10:00   14:00   18:00   22:00  02:00 ⑨ ≡│
   22 │        ────●────────────●──●─────────────────     │
    ╲ │ 5 stars - Nightingale      2D: ┌19:45┐           │
      │ Theatre                                           │
   24 │                                                   │
    ╲ │ 5 stars - Beryulev         2D: ┌18:10┐           │
      │ Theatre                                           │
   26 │                                                   │
    ╲ │ 5 stars - Newsmith         2D: ┌18:25┐           │
      │ Theatre                                           │
   28 │                                                   │
    ╲ │ FILMSTAR LUXURY            2D: ┌19:40┐┌20:30┐    │
      │ Theatre                                           │
      └──────────────────────────────────────────────────┘
```

802 — EXECUTE A SEARCH BASED ON A SEARCH QUERY TO GENERATE SEARCH RESULTS, AT LEAST ONE OF THE SEARCH RESULTS BEING ASSOCIATED WITH A SEARCH RESULT RESOURCE

804 — ACCESS A REGISTER COMPRISING MULTIPLE ENTRIES, AT LEAST ONE OF THE MULTIPLE ENTRIES COMPRISING A PAIR ASSOCIATING A RESOURCE TO A TRANSACTION SERVICE IDENTIFIER

806 — UPON DETERMINING THAT THE SEARCH RESULT RESOURCE ASSOCIATED WITH THE AT LEAST ONE OF THE SEARCH RESULTS CORRESPONDS TO THE RESOURCE OF THE AT LEAST ONE OF THE MULTIPLE ENTRIES OF THE REGISTER, GENERATE A GRAPHICAL COMPONENT ASSOCIATED WITH THE TRANSACTION SERVICE IDENTIFIER CORRESPONDING TO THE RESOURCE OF THE AT LEAST ONE OF THE MULTIPLE ENTRIES OF THE REGISTER

808 — INSERT THE GRAPHICAL COMPONENT WITHIN A SEARCH RESULT PAGE (SERP), THE SERP COMPRISING CONTROL LOGIC TO CAUSE, AS A RESULT OF AN INTERACTION OF THE USER WITH THE GRAPHICAL COMPONENT, ALLOWING THE USER TO CONDUCT A TRANSACTION WITH A TRANSACTION PLATFORM ASSOCIATED WITH THE TRANSACTION SERVICE IDENTIFIER

810 — TRANSMIT THE SERP TO THE ELECTRONIC DEVICE FOR RENDERING ON A DISPLAY OF THE ELECTRONIC DEVICE

*FIG. 8*

METHOD OF AND SYSTEM FOR PROCESSING A SEARCH QUERY

CROSS-REFERENCE

The present application claims priority to Russian Patent Application No 2015111360, filed Mar. 30, 2015, entitled "METHOD OF AND SYSTEM FOR PROCESSING A SEARCH QUERY" the entirety of which is incorporated herein.

FIELD

The present technology relates to systems and methods for processing a search query. In particular, the systems and methods aim at inserting a graphical element within a search result page (SERP). The SERP comprises control logic to cause, as a result of an interaction of a user with the graphical component, allowing the user to conduct a transaction.

BACKGROUND

There are numerous search engines available to a user. Some of them are considered to be general purpose search engines (such as Yandex™, Google™ and the like). Others are considered to be vertical search engines—i.e. search engines dedicated to a particular topic of search—such as Momondo™ search engine dedicated to searching flights.

Irrespective of which search engine is used, the search engine is generally configured to receive a search query from a user, to perform a search and to return a ranked SERP to the user. Several attempts have been made to improve the design of the SERP in the strive to enable the user to more easily and faster interact with search results for example in the context of conducting a transaction from a SERP presented to the user as a result of the processing of a search query.

For example, a screenshot 10 depicted in FIG. 1 illustrates a SERP generated by the search engine Yandex™ as a result of a user entering the search query "Fifty Shades of Grey". The screenshot 10 comprises various fields. Amongst those fields are (1) a query interface 12 and multiple search results. One of the multiple search results is associated with the buying of a ticket to attend a projection of the movie "Fifty Shades of Grey" at various movie theaters. The one of the multiple search results is associated with a widget comprising a button "Buy Ticket" 14 and series of movie showtimes 16. The series of movie showtimes 16 are associated with multiple movie theaters.

Upon clicking the button 14, the user may be presented with a graphical user interface (GUI) component represented by a screenshot 20 in FIG. 1. The screenshot 20 illustrates a movie showtime associated with a first movie theater represented by a result line 22, another movie showtime associated with a second movie theater represented by a result line 24, yet another movie showtime associated with a third movie theater represented by a result line 26 and two movie showtimes associated with a fourth movie theater represented by a result line 28. Each one of the first, second, third and fourth movie theaters represented by the result lines 22, 24, 26 and 28 may be associated with a transaction platform allowing the user to complete the buying of a ticket to attend a selected movie showtime with the corresponding movie theater. As a result of this configuration, the user selecting the movie showtime associated with the first movie theater may be directed to a first transaction platform to complete the buying of ticket. Still under this configuration, the user selecting the movie showtime associated with the second movie theater may be directed to a second transaction platform to complete the buying of ticket, the first transaction platform and the second transaction platform being two different transaction platforms.

SUMMARY

It is an object of present technology to provide improvements, in particular improvements aiming at improving a user experience by streamlining steps required for a completion of a transaction from a SERP presented to a user.

Embodiments of the present technology have been developed based on developers' appreciation of at least one shortcoming associated with the prior art.

As previously described in the paragraphs above, even though a user may be presented with an opportunity to conduct a transaction from a SERP, the user, after having clicked on a "Buy Ticket" button is presented with a GUI component prompting a selection of a transaction platform with which the transaction is to be completed.

The present technology arises from an observation made by the inventor(s) that upon determining that a search result resource associated with a search result correspond to an entry of a register, a graphical component associated with a transaction service identifier corresponding to the entry of the register may be generated and inserted in the SERP. The present technology therefore allows a user to be presented with a button allowing to directly conduct a transaction associated with a specific transaction platform from the SERP and without having to go through an additional step of selecting a transaction platform from a list of transaction platforms.

Thus, in one aspect, various implementations of the present technology provide computer-implemented method of processing a search query received from an electronic device associated with a user, the method executable at a server, the method comprising:

executing a search based on the search query to generate search results, at least one of the search results being associated with a search result resource;

accessing a register comprising multiple entries, at least one of the multiple entries comprising a pair associating a resource to a transaction service identifier;

upon determining that the search result resource associated with the at least one of the search results corresponds to the resource of the at least one of the multiple entries of the register, generating a graphical component associated with the transaction service identifier corresponding to the resource of the at least one of the multiple entries of the register;

inserting the graphical component within a search result page (SERP), the SERP comprising control logic to cause, as a result of an interaction of the user with the graphical component, allowing the user to conduct a transaction with a transaction platform associated with the transaction service identifier; and transmitting the SERP to the electronic device for rendering on a display of the electronic device.

In some implementations, the search is at least one of a general search and a vertical search.

In some further implementations, the search is a general search and further comprising, after executing the search based on the search query, executing a vertical search based on a theme associated with the at least one of the search results to generate vertical search results, at least one of the vertical search results being associated with a vertical search result resource.

In some implementations, upon determining that the vertical search result resource associated with the at least one of the vertical search results corresponds to the resource of the at least one of the multiple entries of the register, generating the graphical component associated with the transaction service identifier corresponding to the resource of the at least one of the multiple entries of the register.

In some further implementations, the theme is one of a show, a movie, a tune, a trip, a service associated with at least one service provider and a product associated with at least one product provider.

In some implementations, the resource of the at least one of the multiple entries of the register is identified by at least one of a Uniform Resource Locator (URL) and a document identifier.

In some further implementations, the transaction service identifier is a parameter identifying the transaction platform and a service associated with the transaction platform.

In some implementations, the transaction platform is configured to conduct transactions associated with a plurality of services.

In some further implementations, the register is a database generated prior to the receiving of the search query.

In some implementations, the SERP further includes the at least one of the vertical search results.

In some further implementations, inserting the graphical component further includes positioning the graphical component in a vicinity of the at least one of the vertical search results.

In some implementations, inserting the graphical component further includes positioning the graphical component in a vicinity of the at least one of the search results.

In some further implementations, the control logic further comprises causing, as a result of the interaction of the user with the graphical component, the rendering of a frame, the frame allowing the user to conduct the transaction with the transaction platform.

In some implementations, the interaction of the user with the graphical component causes:
sending the transaction service identifier associated with the graphical component to the server; and
generating the frame by the server.

In some implementations, the transaction is one of buying a ticket for a theater associated with the resource, buying a service associated with at least one service provider associated with the resource and buying a product associated with at least one product provider associated with the resource.

In some further implementations, the rendering of the frame is realized without the user having to leave the SERP.

In some implementations, the frame is a snippet.

In some further implementations, the frame is generated based on data associated with the one of the search results, the data allowing the user to conduct the transaction solely with the transaction platform.

In some implementations, the data associated with the one of the search results comprises showtime schedules.

In some other aspect, various implementations of the present technology provide a computer-implemented method of processing a search query received from an electronic device associated with a user, the method executable at a server, the method comprising:

executing a general search based on the search query to generate general search results, at least one of the general search results being associated with a theme;
executing a vertical search based on the theme associated with the at least one of the general search results to generate vertical search results, each one of the vertical search results being associated with a vertical search result resource;
accessing a register comprising multiple entries, each one of the multiple entries comprising a pair associating a resource to a transaction service identifier;
upon determining that the vertical search result resource associated with one of the vertical search results corresponds to the resource of one of the multiple entries of the register, generating a graphical component associated with the transaction service identifier corresponding to the resource of the one of the multiple entries of the register;
inserting the graphical component within a search result page (SERP), the SERP comprising control logic to cause, as a result of an interaction of the user with the graphical component, allowing the user to conduct a transaction with the resource corresponding to the transaction service identifier; and
transmitting the SERP to the electronic device for rendering on a display of the electronic device.

In other aspects, various implementations of the present technology provide a non-transitory computer-readable medium storing program instructions for processing a search query, the program instructions being executable by a processor of a computer-based system to carry out one or more of the above-recited methods.

In other aspects, various implementations of the present technology provide a computer-based system, such as, for example, but without being limitative, an electronic device comprising at least one processor and a memory storing program instructions for processing a search query, the program instructions being executable by one or more processors of the computer-based system to carry out one or more of the above-recited methods.

In the context of the present specification, unless expressly provided otherwise, an "electronic device", an "electronic device", a "server", a, "remote server", and a "computer-based system" are any hardware and/or software appropriate to the relevant task at hand. Thus, some non-limiting examples of hardware and/or software include computers (servers, desktops, laptops, netbooks, etc.), smartphones, tablets, network equipment (routers, switches, gateways, etc.) and/or combination thereof.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a file could include the file itself (i.e. its contents), or it could be a unique file descriptor identifying the file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 1 depicts a first screenshot 10 and a second screenshot 20, the screenshot 10 depicting a SERP and the screenshot 20 depicting a GUI component in accordance with the known techniques;

FIG. 8 is a flowchart illustrating a computer-implemented method implementing embodiments of the present technology.

Figure 2:
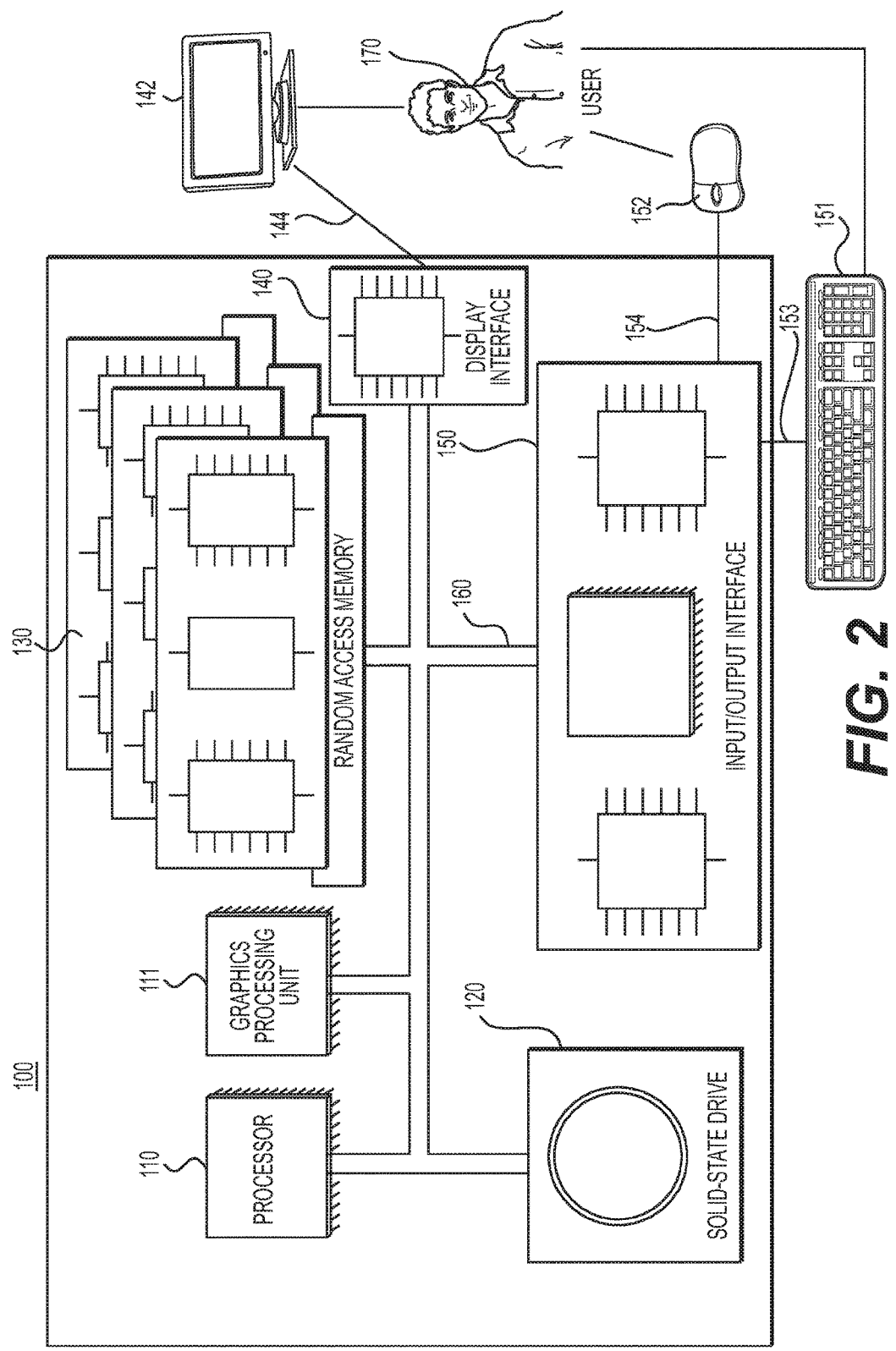
FIG. 2 is a diagram of a computer system suitable for implementing the present technology and/or being used in conjunction with implementations of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Referring to FIG. 2, there is shown a computer system 100 suitable for use with some implementations of the present technology, the computer system 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the computer system 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled. The display interface 140 may be coupled to a monitor 142 (e.g. via an HDMI cable 144) visible to a user 170, and the input/output interface 150 may be coupled to a touchscreen (not shown), a keyboard 151 (e.g. via a USB cable 153) and a mouse 152 (e.g. via a USB cable 154), each of the keyboard 151 and the mouse 152 being operable by the user 170.

According to implementations of the present technology, the solid-state drive 120 stores program instructions suitable for being loaded into the random access memory 130 and executed by the processor 110 and/or the GPU 111 for processing a search query. For example, the program instructions may be part of a library or an application.

Figure 3:
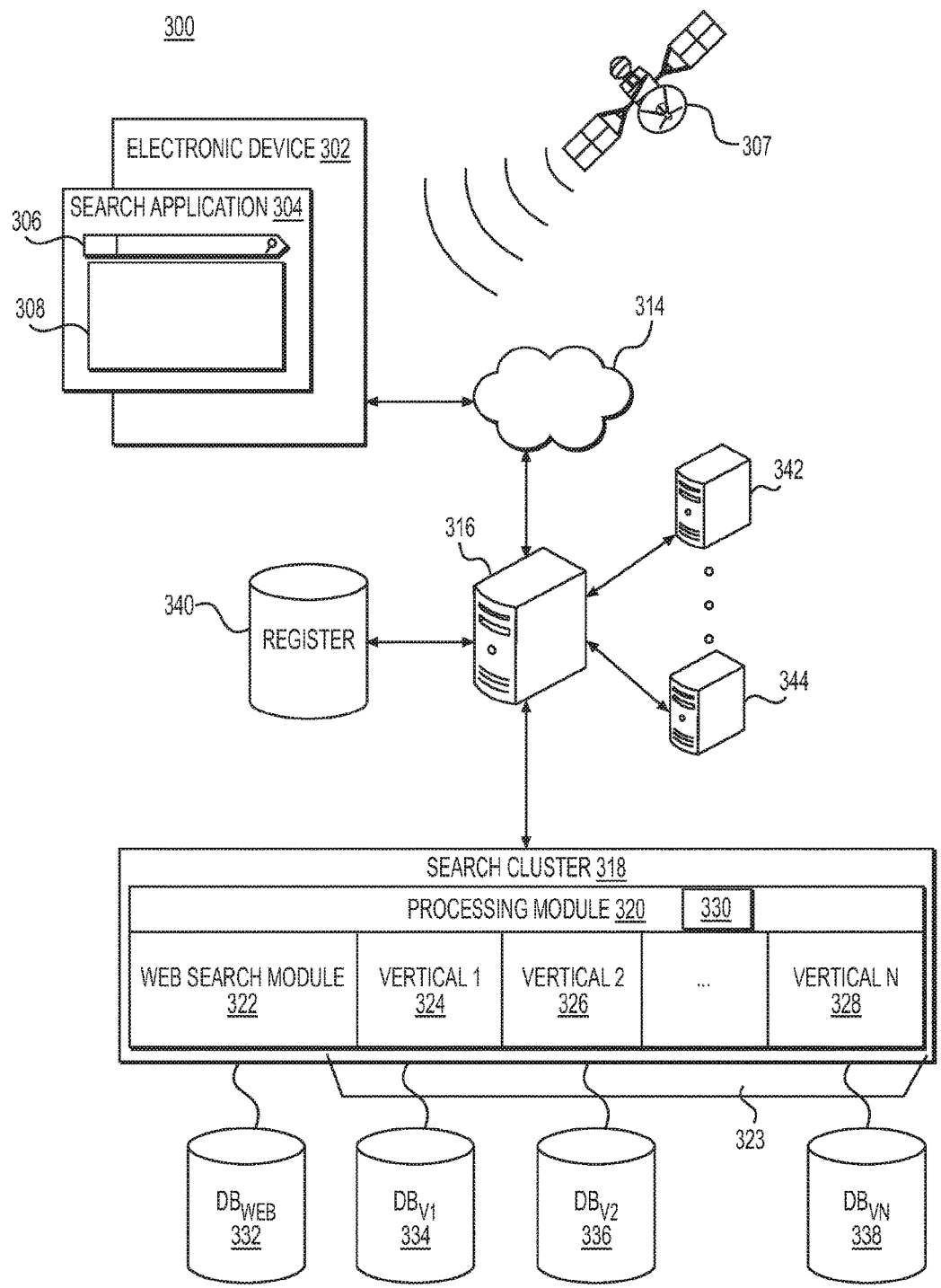
FIG. 3 is a diagram of a networked computing environment in accordance with an embodiment of the present technology.

In FIG. 3, there is shown a networked computing environment 300 suitable for use with some implementations of the present technology. The networked computing environment 300 comprises an electronic device 302 (also referred to as a "client device", an "electronic device" or an "electronic device associated with the user"). The electronic device 302 is typically associated with a user 170 and, as such, can sometimes be referred to as a "client device". It should be noted that the fact that the electronic device 302 is associated with the user 170 does not need to suggest or imply any mode of operation—such as a need to log in, a need to be registered or the like.

The implementation of the electronic device 302 is not particularly limited, but as an example, the electronic device 302 may be implemented as a personal computer (desktops, laptops, netbooks, etc.), a wireless communication device (a cell phone, a smartphone, a tablet and the like), as well as network equipment (a router, a switch, or a gateway). The electronic device 302 comprises hardware and/or software and/or firmware (or a combination thereof), as is known in the art, to execute a search application 304. Generally speaking, the purpose of the search application 304 is to enable the user 170 to execute a search, such as a web search using a search engine hosted on a server 316. To that end, the search application 304 comprises a search query interface 306 and a search results interface 308.

How the search application 304 is implemented is not particularly limited. One example of the search application 304 may be embodied in the user 170 accessing a web site associated with a search engine to access the search application 304. For example, the search application can be accessed by typing in an URL associated with Yandex search engine at www.yandex.ru. It should be expressly understood that the search application 304 can be accessed using any other commercially available or proprietary search engine.

In alternative non-limiting embodiments of the present technology, the search application 304 may be implemented as a browser application on a portable device (such as a wireless communication device). For example (but not limited) to those implementations, where the electronic device 302 is implemented as a portable device, such as for example, Samsung™ Galaxy™ S5, the electronic device may be executing a Yandex browser application. It should be expressly understood that any other commercially available or proprietary browser application can be used for implementing non-limiting embodiments of the present technology.

The electronic device 302 is coupled to a communications network 314 via a communication link (not shown). In some non-limiting embodiments of the present technology, the communications network 314 can be implemented as the Internet. In other embodiments of the present technology, the communications network 314 can be implemented differently, such as any wide-area communications network, local-area communications network, a private communications network and the like.

How the communication link (not shown) is implemented is not particularly limited and will depend on how the electronic device 302 is implemented. Merely as an example and not as a limitation, in those embodiments of the present technology where the electronic device 302 is implemented as a wireless communication device (such as a smart-phone), the communication link (not shown) can be implemented as a wireless communication link (such as but not limited to, a 3G communications network link, a 4G communications network link, a Wireless Fidelity, or WiFi® for short, Bluetooth® and the like). In those examples, where the electronic device 302 is implemented as a notebook computer, the communication link can be either wireless (such as the Wireless Fidelity, or WiFi® for short, Bluetooth® or the like) or wired (such as an Ethernet based connection). In some implementations, the electronic device 302 may be in communication with a GPS satellite 307 transmitting a GPS signal to the electronic device 302.

It should be expressly understood that implementations for the electronic device 302, the communication link (not shown) and the communications network 314 are provided for illustration purposes only. As such, those skilled in the art will easily appreciate other specific implementational details for the electronic device 302, the communication link (not shown) and the communications network 314. As such, by no means, examples provided herein above are meant to limit the scope of the present technology.

Also coupled to the communication network 314 is the server 316. The server 316 can be implemented as a conventional computer server. In an example of an embodiment of the present technology, the server 316 can be implemented as a Dell™ PowerEdge™ Server running the Microsoft™ Windows Server™ operating system. Needless to say, the server 316 can be implemented in any other suitable hardware and/or software and/or firmware or a combination thereof. In the depicted non-limiting embodiment of present technology, the server 316 is a single server. In alternative non-limiting embodiments of the present technology, the functionality of the server 316 may be distributed and may be implemented via multiple servers.

The server 316 is communicatively coupled (or otherwise has access) to a search cluster 318. The general purpose of the search cluster 318 is to perform searches in response to user queries inputted via the query interface 306 and to output search results to be presented to the user using the search results interface 308. What follows is a description of one non-limiting embodiment of the implementation for the search cluster 318. However, it should be understood that there is a number of alternative non-limiting implementations of the search cluster 318 possible. It should be also expressly understood that in order to simplify the description presented herein below, the configuration of the search cluster 318 has been greatly simplified. It is believed that those skilled in the art will be able to appreciate implementational details for the search cluster 318 and for components thereof that may have been omitted for the purposes of simplification of the description.

Generally speaking the purpose of the search cluster 318 is to (i) conduct searches (details will be explained herein below); (ii) execute analysis of search results and perform ranking of search results; (iii) group results and compile the search result page (SERP) to be outputted to the electronic device 302. How the search cluster 318 is configured to execute searches is not particularly limited. Those skilled in the art will appreciate several ways and means to execute the search using the search cluster 318 and as such, several structural components of the search cluster 318 will only be described at a high level.

In some non-limiting embodiments of the present technology, the search cluster 318 comprises a processing module 320. The processing module 320 can execute several searches, including but not limited to, a general search and/or a vertical search. To that end, the processing module 320 comprises (or has access to) a web search module 322. The web search module 322 is configured to perform general web searches, as is known to those of skill in the art.

In some non-limiting embodiments of the present technology, processing module 320 can execute what is known as a multi-level search. These non-limiting embodiments can be implemented, for example, to increase the speed of the search and to obtain more relevant search results. In some non-limiting embodiments of the present technology, the web search module 322 can be responsible for executing the multi-level search.

To that end, the web search module 322 can execute the top level meta search, as will be discussed in greater detail herein below. The web search module 322 may also have access to a database $DB_{WEB}$ 332, which database $DB_{WEB}$ 332 may be accessed by the web search module 322 to conduct a middle level meta search and a bottom level search. Even though the database $DB_{WEB}$ 332 is depicted as a single entity, in some non-limiting embodiments of the present technology, the database $DB_{WEB}$ 332 can be implemented in a distributed manner, for example as a dedicated database for each of the middle level meta search and the bottom level search.

Also, even though the web search module 322 is depicted as a single entity, in alternative non-limiting embodiments of the present technology the web search module 322 may also be implemented in a distributed manner. For example, each of the distributed implementations of the web search modules 322 may be dedicated to search queries originating from a particular geographical region. In those non-limiting embodiments of the present technology, the processing module 320 may determine a location and/or an IP address associated with the electronic device 302 associated with the user 170 who is submitting the search query. Based on the so-determined location and/or the IP address of the electronic device 302, the processing module 320 may forward the search query to one of the distributed web search modules 322 to perform the top level meta search.

The web search module 322 may also forward a request to the database $DB_{WEB}$ 332 to perform the middle level meta search and the bottom level search. In some non-limiting embodiments of the present technology, the database $DB_{WEB}$ 332 may have a portion (or a separate database) dedicated to the middle level meta search (for example, having a repository of frequently asked questions). The identification of the portion (or a separate database) of the database $DB_{WEB}$ 332 responsible for the middle level meta search may be executed by the database $DB_{WEB}$ 332 based on a so-called "CRC-code". The portion (or a separate database) of the database $DB_{WEB}$ 332 responsible for the middle level meta search may send a given generated query to a portion (or a separate database) of the database $DB_{WEB}$ 332 responsible for the bottom level search.

However, in some non-limiting embodiments of the present technology, where the search query is already saved in cache of the portion (or the separate server) of the database $DB_{WEB}$ 332 as part of the middle level meta search, the step of transmitting the query to the portion (or the separate database) of the database $DB_{WEB}$ 332 responsible for the bottom level search may be omitted altogether. Naturally, in alternative embodiments of the present technology, even if the search query is already saved in cache of the portion (or the separate server) of the database $DB_{WEB}$ 332 as part of the middle level meta search, the step of transmitting the query to the portion (or the separate database) of the database $DB_{WEB}$ 332 responsible for the bottom level search may still be performed.

The processing module 320 may further comprise (or may have access to) a plurality of vertical search modules 323. In the depicted non-limiting embodiment, the plurality of vertical search modules includes a vertical 1 module 324, a vertical 2 module 326 and a vertical N module 328. It should be expressly understood that the number of modules within the plurality of vertical search modules 323 is not meant to be a limitation of embodiments of the present technology.

Merely for the purposes of ease of illustration, it shall be assumed that the vertical 1 module 324 is implemented as a vertical search domain for searching movie showtimes and other information relating to movies and/or movie theaters. As such, it can be said that the vertical 1 module 324 implements a movie showtime search engine or, simply, a movie service.

Furthermore, it shall be assumed that the vertical 2 module 326 is implemented as a vertical search module for searching showtimes other than movie showtimes—e.g., concert showtimes. The vertical 2 module 326 may also be implemented for searching information relating to concerts and/or concert halls. As such, it can be said that the vertical 2 module 326 implements a concert showtime vertical search domain or, simply, a concert service. For the various examples to be provided herein below, it shall be assumed, selectively, that the vertical N search module 328 can implement one of services to be bought (e.g., booking of train tickets, booking of plane tickets . . . ), products to be bought or other services. It should be expressly understood that a number of additional or different services can be implemented as part of the plurality of vertical search modules 323.

In some non-limiting embodiments of the present technology, any given one of the plurality of vertical search modules 323 comprises or has access to one or more databases. These one or more databases host data associated with the particular service implemented by the given one of the plurality of vertical search modules 323.

To that extent, the vertical 1 module 324 has access to a database $DB_{V1}$ 334. Recalling that the vertical 1 module 324 implements a movie service, the database $DB_{V1}$ 334 contains information related to movie showtimes of various movies and the associated movie theaters. The vertical 2 module 326 has access to a database $DB_{V2}$ 336. Recalling that the vertical 2 module 326 implements a concert service, the database $DB_{V2}$ 336 can host a repository of information related to concert showtimes of various concerts and the associated concert halls. By the same token, the vertical N module 328 has access to a database $DB_{VN}$ 338. Recalling that the vertical N module 328 implements selectively one of services to be bought, products to be bought or other services, the database $DB_{VN}$ 338 can host a repository of data associated with the respective services.

Additionally or optionally and, as known to those skilled in the art, the one or more databases (such as the database $DB_{V1}$ 334, $DB_{V2}$ 336 and $DB_{VN}$ 338) may be segregated into one or more separate databases. These segregated databases may be portions of the same physical database (such as the database $DB_{V1}$ 334, database $DB_{V2}$ 336 and database $DB_{VN}$ 338) or may be implemented as separate physical entities. For example, one database within, let's say, the database $DB_{V2}$ 336 could host the most popular/most frequently requested concerts in a given category, while another database within the database $DB_{V2}$ 336 could host all the concerts available within the concert service. Needless to say, the above has been provided as an illustration only and several additional possibilities exist for implementing embodiments of the present technology. Also, as is known to those of skill in the art, the search cluster 318 or the server 316 may execute a crawler algorithm—which algorithm causes the search cluster 318 or the server 316 to "crawl" the Internet and index visited web sites into one or more of the databases (such as the database $DB_{V1}$ 334, $DB_{V2}$ 336 and $DB_{VN}$ 338).

Furthermore, it is possible that some of the plurality of vertical search modules 323 may not implement a separate database. This is particularly true, but is not limited to, for example, the vertical N module 328 implementing a product to be bought service. In this example, the vertical N module 328 implementing the product to be bought service may not have a dedicated database, but may rather have access to a service widget repository 330. The service widget repository 330 may be implemented as data repository for one or more widget applications.

Each of the plurality of vertical search modules 323 is configured to perform vertical searches within the respective databases (i.e. database $DB_{V1}$ 334, database $DB_{V2}$ 336 and database $DB_{VN}$ 338). However, it should be noted that the search capabilities of the plurality of vertical search modules 323 are not limited to searching the respective databases (i.e. database $DB_{V1}$ 334, database $DB_{V2}$ 336 and database $DB_{VN}$ 338). As such, the plurality of vertical search modules 323 may perform other searches, as the need may be.

Also, for the purposes of the description presented herein, the term "vertical" (as in vertical search or in vertical search domain) is meant to connote a search performed on a subset of a larger set of data, the subset having been grouped pursuant to an attribute of data. In some embodiments of the present technology, the subset may have been grouped pursuant to one or more themes (e.g., a theme relating to movies, a theme relating to concerts . . . ). For example, to the extent that the vertical 2 module 326 implements a concert service, the vertical 2 module 326 searches a subset (i.e. concerts) of the set of data (i.e. all the data potentially available for searching), the subset of data being stored in the database $DB_{V2}$ 336.

Merely for the purposes of simplifying the description to be presented herein, only a high level description of one approach to executing a search by the search cluster 318 will be presented herein below. It is expected that those skilled in the art will be able to configure the search cluster 318 in any number of known ways without undue experimentation or burden.

As has been mentioned above, in some non-limiting embodiments of the present technology, the processing module 320 can be configured to execute a search in a multi-level meta fashion. In some non-limiting embodiments of the present technology, the processing module 320 includes an http-interface (not depicted) for receiving the search request from the server 316.

When the processing module 320 receives the search query from the server 316, it sends the search query to the web search module 322. As has been alluded to above, in some non-limiting embodiments of the present technology, the sending of the search request to the web search module 322 may be based on the location and/or IP address associated with the electronic device 302, as may be determined by the processing module 320. The web search module 322 performs a search, which in some non-limiting embodiments of the present technology may include a multi-level search. To that extent, the web search module 322 executes some or all of the top level meta search, middle level middle search and the bottom level search.

In some embodiments of the present technology, the processing module 320 may also transmit, in parallel or in sequence, the search query to the plurality of vertical search modules 323 for performing the respective vertical searches. The responses from all the search sources (the plurality of vertical search modules 323 and the web search module 322, which may include the bottom level search, the middle level meta search and the top level meta search) may be received and amalgamated by the processing module 320.

The processing module 320 may then execute a ranking function to generate a ranked search results set. In other words, the processing module 320 ranks the search results by their relevancy to the search query submitted by the user.

As those skilled in the art will appreciate, relevancy within this description shall mean how responsive a given search result is to the user query.

Those skilled in the art will appreciate various techniques available for ranking search results. Just as an example and not as a limitation, some of the known techniques for ranking search results by relevancy are based on some or all of: (i) how popular a given search query or a response thereto is in either the plurality of vertical search modules 323 or in the bottom level search (or any other level of the multi level meta search); (ii) how many results have been returned by either the plurality of vertical search modules 323 or in the bottom level search (or any other level of the multi level meta search); (iii) whether the search query contains any determinative terms (such as "movies", "concerts" or the like), (iv) how often a particular search query is typically used with determinative terms by other users; and (v) how often other uses performing a similar search have selected a particular resource or a particular vertical search results when results were presented using the standard SERP.

Within this description, the term "determinative term" shall mean a word or a string of words indicative of the fact that a given search result is more likely to have the most relevant response to the user search query. For example, if the search query contains the term "concert" it can be determined, by the processing module 320, that the vertical 2 module 326, being implemented as a concert service, is likely to be the service that contains the most relevant results to the user query. Needless to say, only a sub set of these, or these combined to others or any combination of other factors my be taken into account when ranking the search results for relevancy. The search cluster 318 may also be configured to transmit ranked search results to the server 316.

The server 316 may also be communicatively coupled (or otherwise has access) to a register database 340. The general purpose of the register database 340 is to store one or more entries associating resources to transaction service identifiers. In some embodiments of the present technology a resource may be a web resource which may be identified in accordance with known web addressing protocols. Such web addressing protocols may be a Uniform Resource Locator (URL) allowing identification of documents and other resources on the World Wide Web. Other addressing protocols and/or addressing mechanisms may equally be used without departing from the scope of the present technology such as, for example, a document identifier generated upon "crawling" the web and allowing to locate documents or other resources. Under such embodiments, a crawler (not shown) associated with the register database 340 may "crawl" the web to (i) identify resources meeting predetermined criteria and (ii) to allocate a document identifier upon determining that a resource meets the predetermined criteria. In some other embodiments, the crawler (not shown) may not need to be dedicated to the register database 340. For example, but without being limitative, the crawler may be a crawler associated with the processing module 320. Other variations may also be envisioned without departing from the scope of the present technology. In an exemplary embodiment, the crawler (not shown) may "crawl" the web to identify resources associated with a movie theater and/or movie showtimes. In some embodiments, the crawler may also "crawl" a subset of the web, the subset of the web being identified in a dedicated vertical search domain. Upon identifying a resource as being associated with movie theater and/or movie showtimes, an entry may be created in the register database 340. The entry may be a pair associating an indication of a resource (for example, a URL and/or a document identifier) to a transaction service identifier. In some embodiments of the present technology, the transaction service identifier may be an indication that the resource associated to the transaction service identifier in the register database 340 is associated to a transaction service platform allowing a user to conduct a transaction. As an example, but without being limitative, the resource may be a movie theater or a chain of movie theaters associated with a transaction service platform allowing a user to buy a ticket. In such an example, the transaction service identifier associated to the resource will allow identifying the transaction platform with which a transaction may be completed. As a person skilled in the art of the present technology will appreciate, the transaction service identifier may take various forms as long as it comprises an indication allowing the identification of a transaction platform associated with the resource. Also, even though an example associating a movie theater or a chain of movie theaters to a transaction platform is set forth above, the example should not be construed as being limitative of the scope of the present technology. Various alternative embodiments may become apparent to the person skilled in the art without departing from the scope of the present technology.

In some embodiments, the register database 340 may comprise entries comprising additional data in addition to the pair associating a resource to a transaction service identifier. For example, some of the entries of the register database 340 may comprise multiple data fields allowing to identify a resource such as an URL and a document identifier. Some of the entries of the register database 340 may also comprise one or more parameters allowing identification of a service category. As an example, the one or more parameters may be used to differentiate a first transaction platform allowing to conduct a transaction associated to the buying of a movie ticket from a second transaction platform allowing to conduct a transaction associated with a plane ticket.

In yet some alternative embodiments, the transaction service identifier associated to the resource may be null in which case it may be determined that the corresponding resource may not be associated with a transaction platform. In some embodiments, the transaction service identifier may be associated with a transaction platform allowing to conduct transactions associated with multiple services. For example, the transaction platform may allow conducting transactions for movie tickets and transactions for concert tickets. In some embodiments, the transaction service identifier may be indicative of which one of the plurality of transaction services provided by the transaction platform is to be associated with the resource. As an example, and without being limitative, the resource may be a website of a movie theater and the associated transaction service identifier may identify a multiple service transaction platform along with an indication of which one of the multiple services is to be transacted on the multiple service transaction platform (e.g., the movie ticket service or the concert ticket service). The indication may be part of the transaction service identifier and/or associated with the transaction service identifier in which case, the indication may be an additional field in an entry of the register database 340.

In some embodiments, the register database 340 may be hosted on a dedicated server or alternatively be hosted on the server 316. The register database 340 may be generated before a search query is processed by the search cluster 318 and/or in parallel of the search query being processed by the search cluster 318. As previously detailed above, the one or more entries of the register database 340 may be generated and updated by "crawling" the web. Other variations as to how the register database 340 is structured, hosted and populated will become apparent to the person skilled in the art of the present technology without departing from the scope of the present technology.

The architecture of the networked computing environment 300 of FIG. 3 also comprises a first transaction server 342 and a second transaction server 344. The first transaction server 342 and the second transaction server 344 may be communicatively coupled to the server 316 and/or the electronic device 302 via the communications network 314. In some embodiments, the first transaction server 342 and the second transaction server 344 may each host a transaction platform allowing a user to conduct a service transaction for a specific service such as the buying of a movie ticket or a concert ticket. In some embodiments, the first transaction server 342 and/or the second transaction server 344 may host a multiple service transaction platform as previously detailed in connection with the description of the register database 340. It should be understood that there is a number of alternative non-limiting implementations of the first transaction server 342 and the second transaction server 344. It is believed that those skilled in the art of the present technology will be able to appreciate implementational details for the first transaction server 342 and the second transaction server 344 and for components thereof that may have been omitted for the purposes of simplification of the description.

It should be noted that the above described architecture of the networked computing environment 300 of FIG. 3 has been depicted as an example only. Other non-limiting embodiments for the architecture of FIG. 3 are possible and will become apparent to those of skill in the art having benefit of the present disclosure. For example, the plurality of vertical search modules 323 may be accessed by the server 316 independently from the search cluster 318 and, therefore, may be located on a server other than the search cluster 318.

Figure 4:
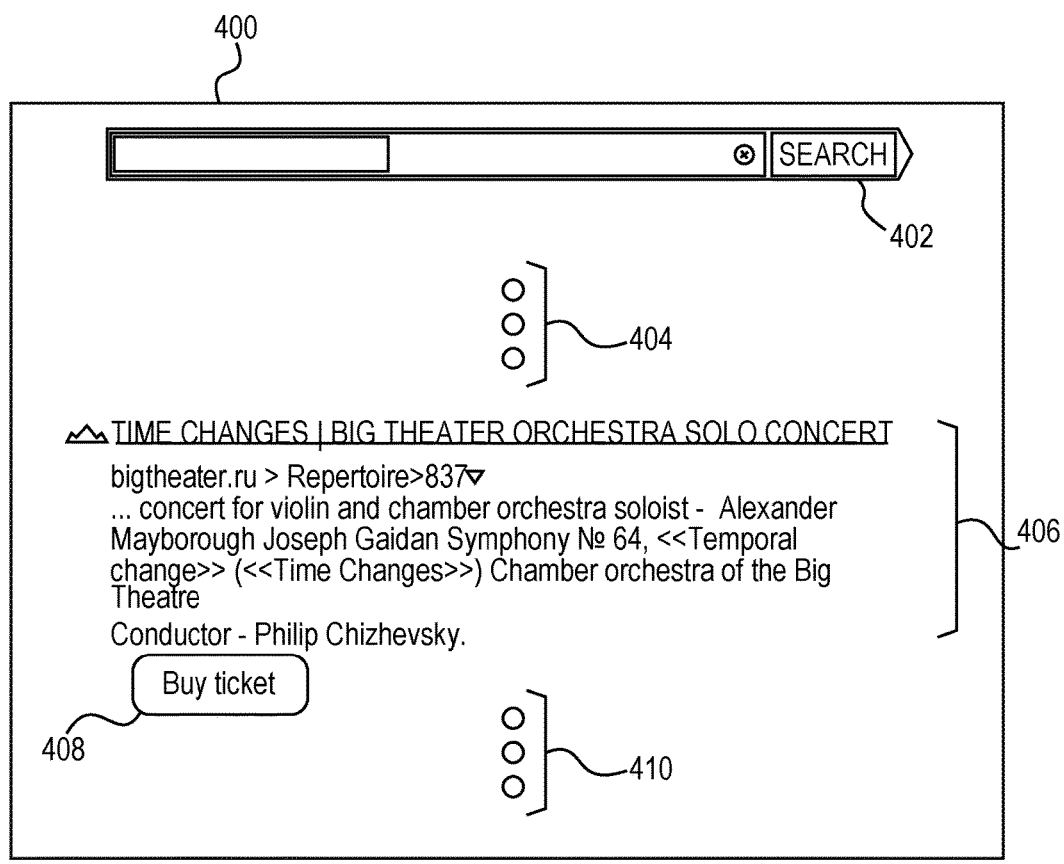
FIG. 4 is a diagram illustrating a SERP generated in accordance with a first embodiment of the present technology.

Turning now to FIG. 4, a screenshot 400 of a SERP generated in accordance with an embodiment of the present technology is depicted. The screenshot 400 comprises a search field 402 allowing the user 170 to enter a search query via input interfaces of the electronic device 302. Upon clicking on a search button associated with the search field 402 the search query entered by the user 170 may be transmitted to the server 316. Upon being received by the server 316, the search query may be processed by the search cluster 318 and/or the processing module 320. In some embodiments of the present technology, the server 316 and/or the search cluster 318 and/or the processing module 320 may comprise control logic to cause an execution of a general search based on the search query to generate one or more search results. The one or more search results may be generated by the web search module 322. The one or more search results may also be generated by one or more of the vertical search modules 323. In some embodiments, the search results may be generated by both the web search module 322 and one or more of the vertical search modules 323.

Before transmitting the SERP comprising the search results to the electronic device 302, the control logic may cause the register database 340 to be accessed in order to determine whether one or more of the search results is associated with a search result resource corresponding to an entry of the register database 340. Upon determining that the search result resource corresponds to a resource of the entry of the register database, the control logic may cause a generation of a graphical component associated with the transaction service identifier corresponding to the resource of the entry of the register database. As a person skilled in the art of the present technology will appreciate, the generated graphical component may take various forms and/or shapes, including the form of a button such as a "buy ticket" button 408 depicted at FIG. 4. Many variations of the shape and appearance of the graphical component may be envisioned without departing from the scope of the present technology.

In some embodiments, a general search is conducted to generate search results. Then, one or more themes associated with the search results is used to conduct one or more vertical searches on the themes and generate one or more vertical search results. The one or more vertical search results (e.g., resources associated with the one or more vertical search results) are then compared with the entries of the register database 340. As a result, the transaction service identifier may be associated with data relating to the one or more vertical search results. For example, but without being limitative, a search query relating to a title of a movie may result in a general search being first conducted and may result in an identification of a theme "movie". The theme "movie" may then be used to conduct a vertical search associated with a movie service. The vertical search may result in vertical search results identifying showtimes and movie theaters associated with the movie. The vertical search results may then be associated with a transaction service identifier corresponding to a resource associated with the vertical search results.

In some embodiments, the generated graphical component may be inserted within a SERP such as the SERP represented by the screenshot 400. In some embodiments, the SERP is created so as to include the generated graphical component in a vicinity of a representation of the one or more of the search results, such as, for example the "buy ticket" button 408 located below a search result 406. In some embodiments, the SERP further includes control logic causing, as a result of an interaction of the user 170 with the "buy ticket" button 408, the conduct of a transaction with a specific transaction platform associated with the transaction service identifier. In an embodiment, the interaction of the user 170 may be a click of the "buy ticket" button 408 by the user 170. Other variations as to how the user 170 may interact with the graphical component may be envisioned without departing from the scope of the present technology. In some embodiments where the transaction service identifier may be associated with vertical search results, the SERP further includes control logic causing, as a result of an interaction of the user 170 with the "buy ticket" button 408, the conduct of a transaction with a specific transaction platform associated with the transaction service identifier. The transaction may be associated with data relating to the vertical search results. For example, but without being limitative, the vertical search results may be associated with showtimes of a movie. Upon clicking on the "buy ticket" button 408, the user 170 may be prompted to select a showtime based on the data relating to the vertical search results. In other words, the showtimes associated with the vertical search results may be presented to the user 170 once the transaction is initiated and without requiring a vertical search to identify showtimes to be run after the user 170 has clicked on the "buy ticket" button 408.

In some embodiments, the specific transaction platform may be hosted on the first transaction server 342 and/or the second transaction server 344. In the example depicted at FIG. 4, the "buy ticket" button 408 is associated with a transaction platform allowing to buy a ticket to attend a show at the Bolshoi Theater. Still under this example, a clicking of the "buy ticket" button 408 by the user 170 may result in the user 170 being prompted to complete a transaction with a transaction platform allowing buying tickets to attend a show at the Bolshoi Theater. As a result, the user 170 may directly conduct a transaction without having to identify a specific transaction platform from a list of transaction platforms and/or having to identify a specific theater from a list of theaters where the show is played. Furthermore, the user 170 may conduct the transaction without leaving the SERP. The transaction service identifier associated with the "buy ticket" button 408 therefore allows automatically identifying a transaction platform and/or a theater without requiring the user 170 to specify the transaction platform and/or the theater.

As previously mentioned, even though the example depicted at FIG. 4 is associated with the buying of a ticket to attend a show at a theater, many variations may be envisioned without departing from the scope of the present technology. In addition, how the control logic allowing the user 170 to conduct a transaction with the transaction platform is configured is not limitative and various implementations may be envisioned without departing from the scope of the present technology. Also, while the example set forth above makes reference to generating the graphical component and then inserting it within the SERP, other alternative may also be envisioned such as generating control logic causing a representation of the graphical component within the SERP on the electronic device 302 after the SERP has been transmitted to the electronic device 302. In such embodiments, the graphical component may not need to be transmitted to the electronic device 302 per se, the transmission of the transaction service identifier to the electronic device 302 may be sufficient. In addition, even though one search result 406 associated with a "buy ticket" button 408 is represented, it should be understood that other search results may also be included in the SERP. Such other search results may have a higher ranking than the search result 406 and be located in an area 404 of the SERP or a lower ranking than the search result 406 and be located in an area 410 of the SERP. Such other search results may or may not be associated with graphical components such as the "buy ticket" button 408. As the person skilled in the art of the present technology will appreciate, many variations may be envisioned without departing from the scope of the present technology.

In some embodiments, once the SERP including the search result 406 and the "buy ticket" button 408 associated with the transaction service identifier is generated, the SERP may then be transmitted to the electronic device 302 for rendering on a display of the electronic device 302. In yet some embodiments, the transmitted SERP may be stored in a memory of the electronic device 302 prior to being rendered on the display of the electronic device 302.

Figure 5:
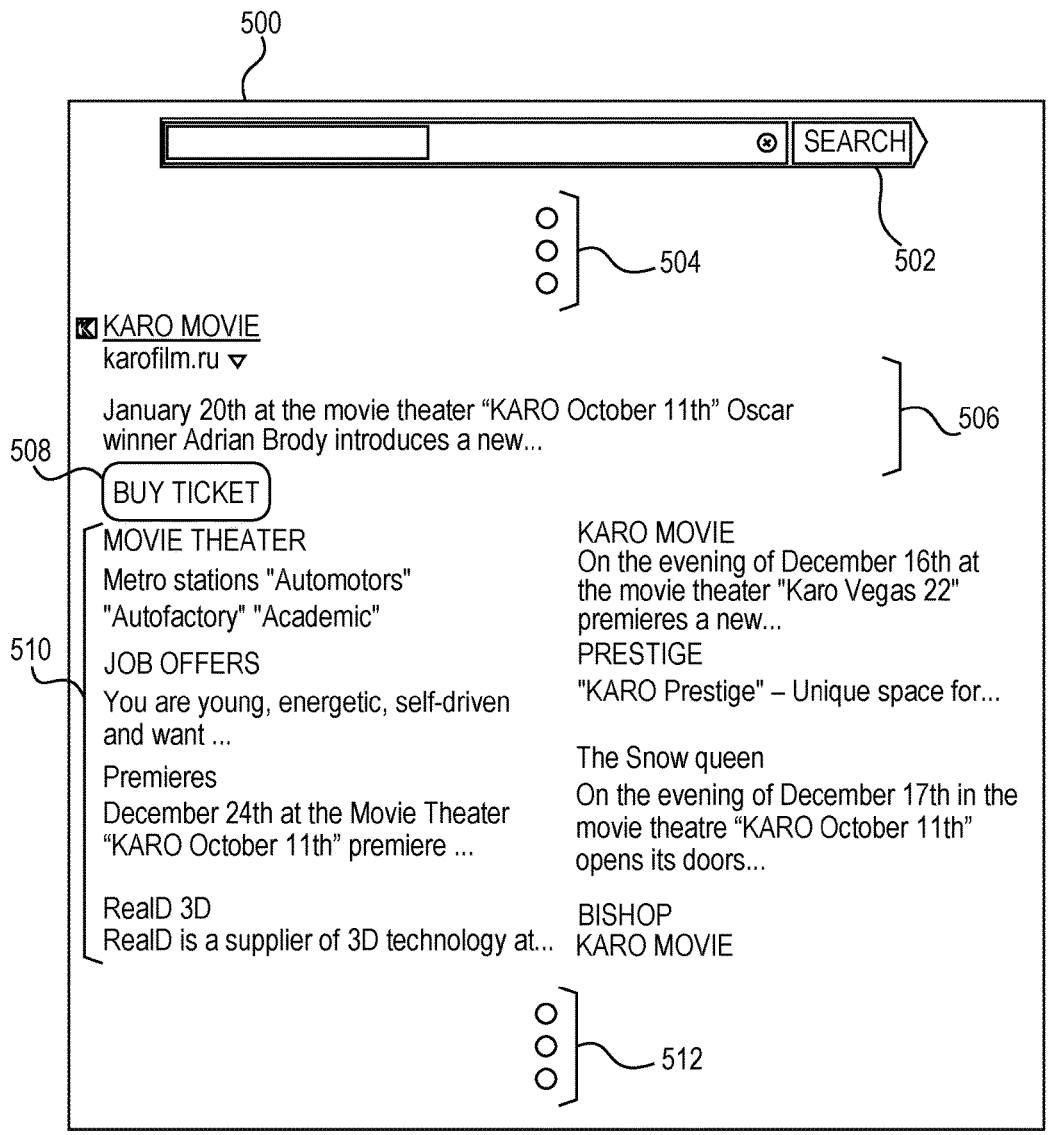
FIG. 5 is a diagram illustrating a SERP generated in accordance with a second embodiment of the present technology.

Referring now to FIG. 5, a diagram illustrates a screenshot 500 of a SERP generated in accordance with a second embodiment of the present technology. Similarly to the screenshot 400 depicted at FIG. 4, the screenshot 500 comprises a search field 502 allowing the user 170 to enter a search query via input interfaces of the electronic device 302. Upon clicking on a search button associated with the search field 502 the search query entered by the user 170 may be transmitted to the server 316. The search query may be processed by the server 316 in accordance with the method detailed in connection with the description of FIG. 4. However, the SERP generated in accordance with the second embodiment is configured to further display a set of search results 510 below a search result 506 associated with a "buy ticket" button 508. As for the screenshot 400, the SERP of the screenshot 500 may comprise additional search results 504 positioned above the search result 506 and additional search results 512 positioned below the search result 506.

Figure 6:
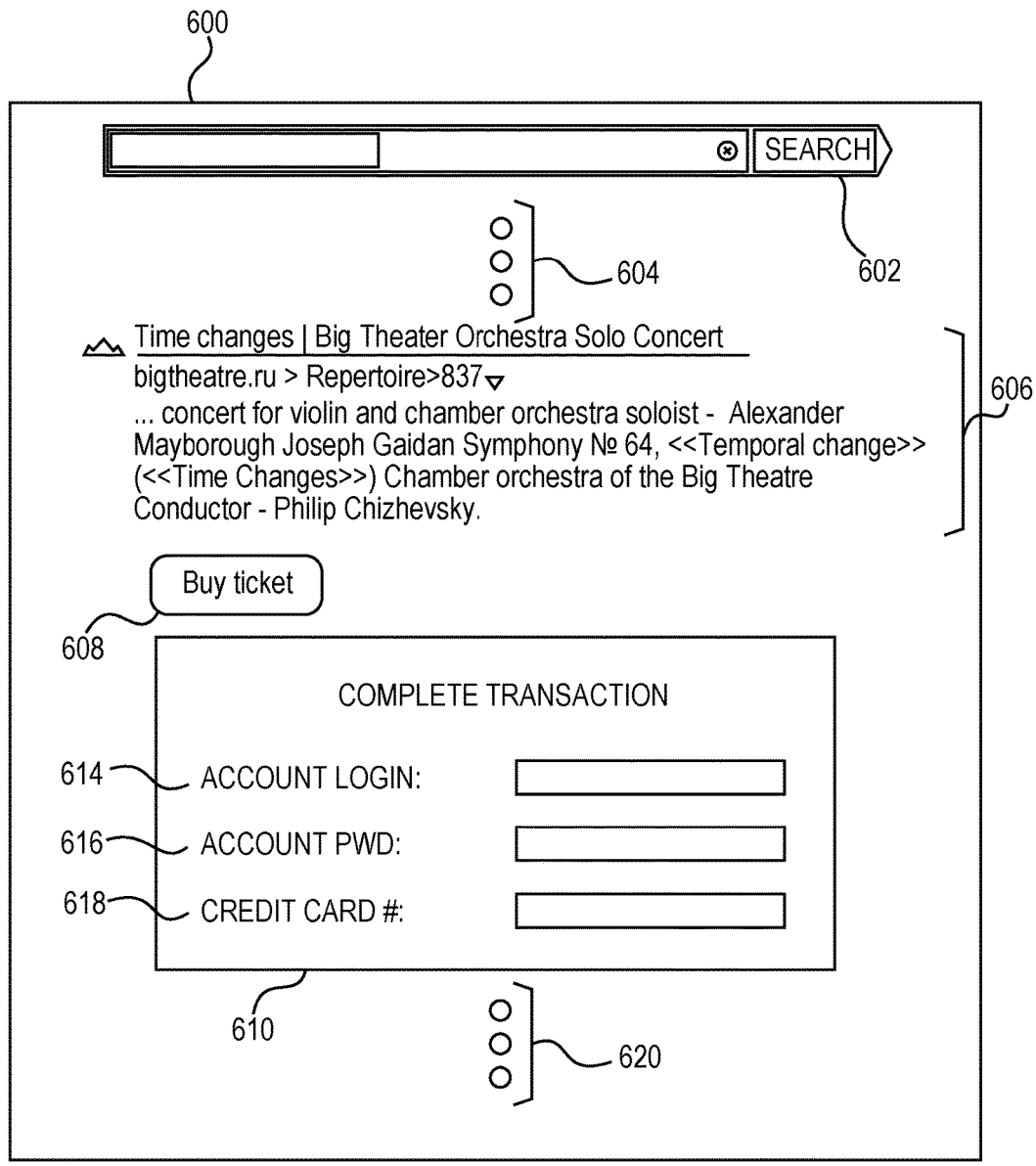
FIG. 6 is a diagram illustrating the SERP of FIG. 4 further comprising a transaction GUI component in accordance with a third embodiment of the present technology.

Turning now to FIG. 6, a diagram illustrates a screenshot 600 of the SERP of FIG. 4 further comprising a transaction GUI component 610. In this embodiment, the transaction GUI component 610 has been generated and/or displayed to the user 170 as a result of the user 170 interacting with a "buy ticket" button 608 which corresponds to the "buy ticket" button 408 of FIG. 4. The transaction GUI component 610 allows the user 170 to conduct a transaction with a transaction platform corresponding to a transaction service identifier. The transaction platform may be hosted by one or more server such as the first transaction server 342 and the second transaction server 344. How the logic resulting in the displaying of the transaction GUI component 610 is not particularly limitative and many implementation variations may be envisioned by the person skilled in the art of the present technology as long as the transaction GUI component 610 allows the user 170 to conduct the transaction with the transaction platform corresponding to a transaction service identifier.

In the embodiment depicted at FIG. 6, the transaction GUI component 610 defines a frame located below a search result 606 corresponding to the search result 406 shown in FIG. 4. The frame comprises a text message "Complete Transaction" prompting the user 170 to provide certain information which may be necessary to conduct the transaction. In the embodiment exemplified in FIG. 6 the user 170 is prompted to provide data relating to an account login 614, an account password 616 and a credit card number 618. Other information may also be requested to the user such as, but without being limitative, a selected showtime, a number of tickets, etc. As the person skilled in the art of the present technology will appreciate that various variations as to how the transaction GUI component 610 is represented (e.g., a position of the transaction GUI component 610, a size of the transaction GUI component, a level of transparency of the transaction GUI component, etc.) what information the user 170 may be prompted to provide may be envisioned without departing from the scope of the present technology. For example, but without being limitative, the transaction GUI component 610 may take the form of a GUI component prompting the user 170 to complete a series of steps in order to complete the transaction. In some embodiments, the series of steps may include (i) a selection of a number of tickets; (ii) a selection of a seat location; and/or (iii) prompting the user 170 to provide information relating to her/his credit card. In yet some other embodiments, the transaction GUI component 610 may not need to be presented to the user 170. In such embodiments, the transaction may be completed upon clicking on the "buy ticket" button 608 without requiring any further action from the user 170. In such embodiments, the user 170 may already be engaged in an active session (i.e., logged-in) with the server 316 in which case the server 316 may already have access to information allowing the conduct of the transaction.

As previously described in connection with FIG. 4, the SERP of the screenshot 600 may comprise additional search results 608 positioned above the search result 606 and additional search results 620 positioned below the search result 606. The SERP of the screenshot 600 may also comprise a search field 602 corresponding to the search field 402 of FIG. 4.

Figure 7:
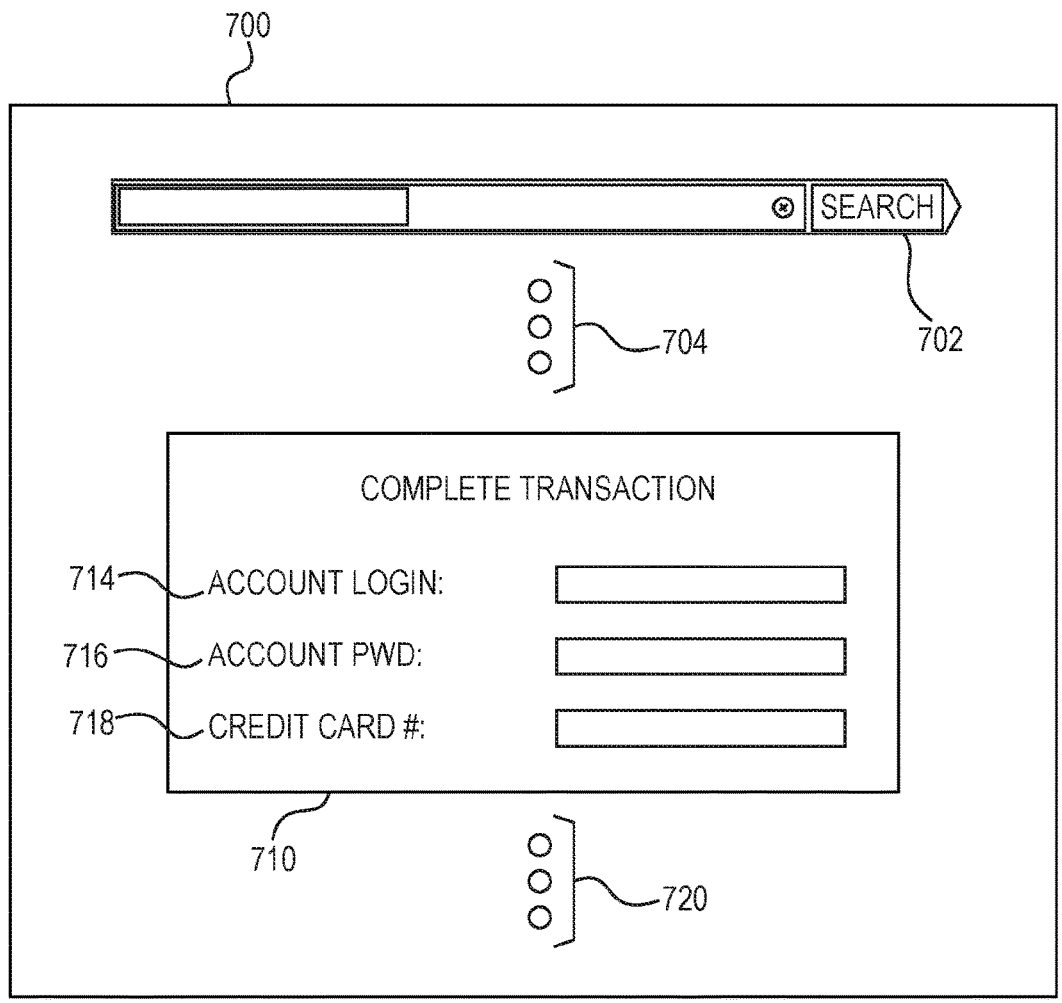
FIG. 7 is a diagram illustrating the SERP of FIG. 4 further comprising a transaction GUI component in accordance with a fourth embodiment of the present technology.

Referring now to FIG. 7, a diagram illustrating a screenshot 700 of the SERP of FIG. 4 further comprising a transaction GUI component 710. As previously described in connection with FIG. 4 and FIG. 6, the SERP of the screenshot 700 may comprise a search field 702 corresponding to the search field 402, additional search results 704 positioned above a transaction GUI component 710 and additional search results 720 positioned below the transaction GUI component 710. In the embodiment exemplified at FIG. 7, an interaction of the user 170 with the "buy ticket" button 408 of FIG. 4 may cause the transaction GUI component 710 to be displayed at a location of the SERP where the search result 406 was displayed prior to the user 170 interacting with the "buy ticket" button 408. As previously described in connection with the description of FIG. 6, the transaction GUI component 710 may prompt the user 170 to provide data relating to an account login 714, an account password 716 and a credit card number 718.

Given the architecture described with reference to FIG. 3 and the examples of FIG. 4-7, it is possible to execute a method of processing a search query in response to a search query. The method can be, for example, but without being limitative, conveniently executable at the server 316. To that extent, the server 316 may comprise non-transitory computer usable information storage medium that enables the server 316 to execute the method in accordance with embodiments of the present technology. For the sake of an example, the method 800 will be illustrated as executed on the server 316.

More specifically, FIG. 8 shows a flowchart illustrating a computer-implemented method of 800 processing a search query received from the electronic device 302 associated with the user 170. The method 800 starts with step 802 by executing a search based on the search query to generate search results, at least one of the search results being associated with a search result resource. In some embodiments, the search is a general search and/or a vertical search. In yet some embodiments, the search is a general search and further comprises, after executing the search based on the search query, executing a vertical search based on a theme associated with the at least one of the search results to generate vertical search results, at least one of the vertical search results being associated with a vertical search result resource. In some embodiments, the theme is one of a show, a movie, a tune, a trip, a service associated with at least one service provider and a product associated with at least one product provider. In some embodiments, data associated with the search results comprises showtime schedules.

Then, at a step 804, the method 800 may access a register comprising multiple entries, at least one of the multiple entries comprising a pair associating a resource to a transaction service identifier. In some embodiments, the register may be hosted by the service database 340. In some embodiments, the service database 340 may have been generated prior to the receiving of the search query. In some embodiments, the resource of the register may be identified by a Uniform Resource Locator (URL) and/or a document identifier. The transaction service identifier may be a parameter identifying the transaction platform and/or a service associated with the transaction platform.

At a step 806, the method 800, upon determining that the search result resource associated with the at least one of the search results corresponds to the resource of the at least one of the multiple entries of the register, may generate a graphical component (e.g., the "buy ticket" button 408) associated with the transaction service identifier corresponding to the resource of the at least one of the multiple entries of the register. In some alternative embodiments, upon determining that the vertical search result resource associated with the at least one of the vertical search results corresponds to the resource of the at least one of the multiple entries of the register, the method 800 may generate the graphical component associated with the transaction service identifier corresponding to the resource of the at least one of the multiple entries of the register.

Then, at a step 808, the method 800 may insert the graphical component within a SERP, the SERP comprising control logic to cause, as a result of an interaction of the user 170 with the graphical component, allowing the user 170 to conduct a transaction with a transaction platform associated with the transaction service identifier. In some embodiments, the SERP may also include one or more vertical search results. In some embodiments, the step 808 may also include positioning the graphical component in a vicinity of the search results (i.e., the general search results and/or the vertical search results as the case may be). In addition, the control logic may also include instructions to cause, as a result of the interaction of the user 170 with the graphical component, the rendering of a frame, the frame allowing the user to conduct the transaction with the transaction platform. In some embodiments, the frame is a snippet and the rendering of the frame is realized without the user 170 having to leave the SERP. In yet some embodiments, the frame is generated based on data associated with the search results (e.g., the general search results and/or the vertical search results). The data may allow the user 170 to conduct the transaction solely with the transaction platform. In some embodiments, the transaction may be buying a ticket for a theater associated with the resource, buying a service associated with at least one service provider associated with the resource and/or buying a product associated with at least one product provider associated with the resource. In some embodiments, the transaction platform may be configured to conduct transactions associated with a plurality of services.

At a step 810, the method 800 may cause a transmission of the SERP to the electronic device 302 for rendering on a display. The user 170 may then interact with the graphical component. In some embodiments, the interaction of the user 170 with the graphical component may cause (i) sending the transaction service identifier associated with the graphical component to the server; and (ii) generating the frame based on the transaction service identifier by the server 316.

As a person skilled in the art will appreciate, many variations of the method 800 may be envisioned, including, but without being limitative, a method which comprises executing a general search based on a search query to generate general search results, at least one of the general search results being associated with a theme. The method may also comprise executing a vertical search based on the theme associated with the at least one of the general search results to generate vertical search results, each one of the vertical search results being associated with a vertical search result resource. Once the vertical search is executed, or in parallel to the execution of the vertical search, the method may access a register comprising multiple entries, each one of the multiple entries comprising a pair associating a resource to a transaction service identifier. Upon determining that the vertical search result resource associated with one of the vertical search results corresponds to the resource of one of the multiple entries of the register, the method may generate a graphical component associated with the transaction service identifier corresponding to the resource of the one of the multiple entries of the register. The method may then pursue with similar steps to the steps 808 and 810 to transmit a SERP to the electronic device 302 for storing and/or rendering on the display of the electronic device 302.

While the above-described implementations have been described and shown with reference to particular steps performed in a particular order, it will be understood that these steps may be combined, sub-divided, or re-ordered without departing from the teachings of the present technology. Accordingly, the order and grouping of the steps is not a limitation of the present technology.

One skilled in the art will appreciate when the instant description refers to "receiving data" from a user that the electronic device 302 or another electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A computer-implemented method of processing a search query received from an electronic device associated with a user, the method executable at a server, the method comprising:

executing a search based on the search query to generate search results, at least one of the search results being associated with a search result resource;

accessing a register comprising multiple entries, a first entry of the multiple entries comprising a first pair associating a first resource to a first transaction service identifier, the first transaction service identifier associating the first resource to a specific first transaction platform of a plurality of different transaction platforms, a second entry of the multiple entries comprising a second pair associating a second resource to a second transaction service identifier, the second resource being different from the first resource, the second transaction service identifier being different from the first transaction service identifier, the second transaction service identifier associating the second resource to a specific second transaction platform of the plurality of different transaction platforms, the specific second transaction platform being different from the specific first transaction platform, at least one of the first and second entries comprising at least one parameter differentiating the specific first transaction platform from the specific second transaction platform;

determining via the register that the search result resource associated with the at least one of the search results corresponds to the first resource;

determining, by processing the at least one parameter of the at least one of the first and second entries, that the first resource is associated with the specific first transaction platform of the plurality of different transaction platforms;

upon the determining that the search result resource associated with the at least one of the search results corresponds to the first resource of the multiple entries of the register and that the first resource is associated to the specific first transaction platform, generating a graphical component associated with the first transaction service identifier and the specific first transaction platform of the plurality of different transaction platforms;

inserting the graphical component within a search result page (SERP), the SERP comprising control logic to cause, as a result of an interaction of the user with the graphical component, the rendering of a frame within the SERP allowing the user to complete a transaction, without leaving the SERP, with the specific first transaction platform of the plurality of different transaction platforms; and transmitting the SERP to the electronic device for rendering on a display of the electronic device.

2. The method of claim 1, wherein the search is at least one of a general search and a vertical search.

3. The method of claim 1, wherein the search is a general search and further comprising, after executing the search based on the search query, executing a vertical search based on a theme associated with the at least one of the search results to generate vertical search results, at least one of the vertical search results being associated with a vertical search result resource.

4. The method of claim 3, further comprising, upon determining that the vertical search result resource associated with the at least one of the vertical search results corresponds to the first resource of the multiple entries of the register, generating the graphical component associated with the first transaction service identifier corresponding to the first resource of the multiple entries of the register.

5. The method of claim 4, wherein the theme is one of a show, a movie, a tune, a trip, a service associated with at least one service provider and a product associated with at least one product provider.

6. The method of claim 3, wherein the SERP further includes the at least one of the vertical search results.

7. The method of claim 6, wherein inserting the graphical component further includes positioning the graphical component in a vicinity of the at least one of the vertical search results.

8. The method of claim 1, wherein the first resource of the multiple entries of the register is identified by at least one of a Uniform Resource Locator (URL) and a document identifier.

9. The method of claim 1, wherein the first transaction service identifier includes the at least one parameter identifying the specific first transaction platform and the at least one parameter further identifies a service associated with the specific first transaction platform.

10. The method of claim 1, wherein the specific first transaction platform is configured to conduct transactions associated with a plurality of services.

11. The method of claim 1, wherein the register is a database generated prior to the receiving of the search query.

12. The method of claim 1, wherein inserting the graphical component further includes positioning the graphical component in a vicinity of the at least one of the search results.

13. The method of claim 1, wherein the interaction of the user with the graphical component causes:
   sending the first transaction service identifier associated with the graphical component to the server; and
   generating the frame by the server.

14. A computer-implemented method of processing a search query received from an electronic device associated with a user, the method executable at a server, the method comprising:
   executing a general search based on the search query to generate general search results, at least one of the general search results being associated with a theme;
   executing a vertical search based on the theme associated with the at least one of the general search results to generate vertical search results, each one of the vertical search results being associated with a vertical search result resource;
   accessing a register comprising multiple entries, a first entry of the multiple entries comprising a first pair associating a first resource to a first transaction service identifier, the first transaction service identifier associating the first resource to a specific first transaction platform of a plurality of different transaction platforms, a second entry of the multiple entries comprising a second pair associating a second resource to a second transaction service identifier, the second resource being different from the first resource, the second transaction service identifier being different from the first transaction service identifier, the second transaction service identifier associating the second resource to a specific second transaction platform of the plurality of different transaction platforms, the specific second transaction platform being different from the specific first transaction platform, at least one of the first and second entries comprising at least one parameter differentiating the specific first transaction platform from the specific second transaction platform;
   determining via the register that the vertical search result resource associated with the at least one of the vertical search results corresponds to the first resource;
   determining, by processing the at least one parameter of the at least one of the first and second entries, that the first resource is associated with the specific first transaction platform of the plurality of different transaction platforms;
   upon the determining that the vertical search result resource associated with one of the vertical search results corresponds to the first resource of the multiple entries of the register and that the first resource is associated to the specific first transaction platform, generating a graphical component associated with the first transaction service identifier and the specific first transaction platform of the plurality of different transaction platforms;
   inserting the graphical component within a search result page (SERP), the SERP comprising control logic to cause, as a result of an interaction of the user with the graphical component, the rendering of a frame within the SERP allowing the user to complete a transaction, without leaving the SERP, with the first specific transaction platform of the plurality of different transaction platforms; and
   transmitting the SERP to the electronic device for rendering on a display of the electronic device.

15. A computer-implemented system for processing a search query, the system comprising:
   a non-transitory computer-readable medium;
   a processor configured to perform:
   executing a search based on the search query to generate search results, at least one of the search results being associated with a search result resource;
   accessing a register comprising multiple entries, a first entry of the multiple entries comprising a first pair associating a first resource to a first transaction service identifier, the first transaction service identifier associating the first resource to a specific first transaction platform of a plurality of different transaction platforms, a second entry of the multiple entries comprising a second pair associating a second resource to a second transaction service identifier, the second resource being different from the first resource, the second transaction service identifier being different from the first transaction service identifier, the second transaction service identifier associating the second resource to a specific second transaction platform of the plurality of different transaction platforms, the specific second transaction platform being different from the specific first transaction platform, at least one of the first and second entries comprising at least one parameter differentiating the specific first transaction platform from the specific second transaction platform;
   determining via the register that the search result resource associated with the at least one of the search results corresponds to the first resource;
   determining, by processing the at least one parameter of the at least one of the first and second entries, that the first resource is associated with the specific first transaction platform of the plurality of different transaction platforms;
   upon the determining that the search result resource associated with the at least one of the search results corresponds to the first resource of the multiple entries of the register and that the first resource is associated to the specific first transaction platform, generating a graphical component associated with the first transaction service identifier and the specific first transaction platform of the plurality of different transaction platforms;
   inserting the graphical component within a search result page (SERP), the SERP comprising control logic to cause, as a result of an interaction of the user with the graphical component, the rendering of a frame within the SERP allowing the user to complete a transaction, without leaving the SERP, with the specific first transaction platform of the plurality of different transaction platforms; and
   transmitting the SERP to the electronic device for rendering on a display of the electronic device.

16. The system of claim 15, wherein the search is at least one of a general search and a vertical search.

17. The system of claim 15, wherein the search is a general search and further comprising, after executing the search based on the search query, executing a vertical search based on a theme associated with the at least one of the search results to generate vertical search results, at least one of the vertical search results being associated with a vertical search result resource.

18. The system of claim 17, further comprising, upon determining that the vertical search result resource associated with the at least one of the vertical search results corresponds to the first resource of the multiple entries of the register, generating the graphical component associated with the first transaction service identifier corresponding to the first resource of the multiple entries of the register.

19. The system of claim 18, wherein the theme is one of a show, a movie, a tune, a trip, a service associated with at least one service provider and a product associated with at least one product provider.

20. The system of claim 15, wherein the first resource of the multiple entries of the register is identified by at least one of a Uniform Resource Locator (URL) and a document identifier.

\* \* \* \* \*